(12) United States Patent
Wu et al.

(10) Patent No.: US 12,055,175 B2
(45) Date of Patent: Aug. 6, 2024

(54) FLOATING FASTENER

(71) Applicant: HANWIT PRECISION INDUSTRIES LTD., New Taipei (TW)

(72) Inventors: Ming-De Wu, New Taipei (TW); Chih-Yuan Chen, New Taipei (TW)

(73) Assignee: HANWIT PRECISION INDUSTRIES LTD., New Taipei (TW)

(*) Notice: Subject to any disclaimer, the term of this patent is extended or adjusted under 35 U.S.C. 154(b) by 209 days.

(21) Appl. No.: 17/747,884

(22) Filed: May 18, 2022

(65) Prior Publication Data
US 2023/0375032 A1 Nov. 23, 2023

(51) Int. Cl.
*F16B 39/02* (2006.01)
*F16B 5/02* (2006.01)
*F16B 41/00* (2006.01)

(52) U.S. Cl.
CPC ............ *F16B 39/02* (2013.01); *F16B 5/0208* (2013.01); *F16B 41/002* (2013.01)

(58) Field of Classification Search
CPC ....... F16B 41/002; F16B 5/0208; F16B 19/02
USPC ........................................................ 411/107
See application file for complete search history.

(56) References Cited

U.S. PATENT DOCUMENTS

| | | | | |
|---|---|---|---|---|
| 4,732,519 A * | 3/1988 | Wagner | ................... | F16B 35/04 403/14 |
| 8,454,290 B2 * | 6/2013 | Schaser | ................... | F16F 1/328 411/902 |
| 8,511,956 B2 * | 8/2013 | Liu | ..................... | H01L 23/4006 411/107 |
| 8,827,614 B2 * | 9/2014 | Tseng | .................... | F16B 5/0208 411/107 |
| 8,950,991 B2 * | 2/2015 | Trifilio | .................. | F16B 5/0208 411/103 |
| 8,955,851 B2 * | 2/2015 | Matsumoto | ............ | F16J 15/104 277/937 |
| 11,549,547 B2 * | 1/2023 | Yuan | ..................... | F16B 43/001 |
| 11,592,050 B2 * | 2/2023 | Clark | .................. | F16B 19/1081 |
| 2015/0292538 A1 * | 10/2015 | He | ........................ | F16B 5/0208 411/166 |
| 2017/0146050 A1 * | 5/2017 | Wang | .................... | F16B 5/0208 |
| 2018/0231037 A1 * | 8/2018 | Wu | ....................... | F16B 5/0208 |
| 2019/0003501 A1 * | 1/2019 | Wu | ....................... | F16B 5/0208 |
| 2020/0040928 A1 * | 2/2020 | Ganter | .................. | F16B 19/109 |

* cited by examiner

*Primary Examiner* — Gary W Estremsky
(74) *Attorney, Agent, or Firm* — MUNCY, GEISSLER, OLDS & LOWE, PC

(57) ABSTRACT

Floating fastener includes base including main body provided with through hole, resisting ring protruded inside through hole, seat body extended around main body and docking portion protruded from seat body, positioning member having shank inserted into through hole, head located at one end of shank outside main body, joint portion located at an opposite end of shank to move in and out of docking portion and stopper provided between joint portion and shank to abut against resisting ring, elastic member set on shank and stopped between head and resisting ring, and pad provided with inner hole which is inserted outside docking portion of base, so that pad abuts against seat body near the docking portion. The pad is made of soft material, which can achieve the purpose of absorbing the shaking and vibration of the floating fastener under the influence of external force.

14 Claims, 18 Drawing Sheets

FLOATING FASTENER

BACKGROUND OF THE INVENTION

1. Field of the Invention

The present invention relates to fasteners more particularly, to a floating fastener that can reduce shaking and vibration under external force, wherein a positioning member is pierced inside the base, the joint portion on one side of the positioning member can move in and out of the docking portion on the side of the base, and the docking portion is externally provided with a soft material pad against one side of the seat body of the base to achieve the purpose of using the pad to absorb the shaking and vibration force after assembly, and avoiding the phenomenon of poor signal caused by the vibration affecting the electronic parts of the first plate member and the second plate member.

2. Description of the Related Art

Please refer to FIGS. 17 and 18, which are a side sectional exploded view and a side sectional view of a conventional floating fastener. It is embedded in the cap A with the screw A1, and the elastic member B is attached to the screw A1, and the cap A and the elastic member B are fixed on the connecting seat C. Use the inner hook A2 under the cap A to be fastened to the flange C1 at the upper end of the connecting seat C, so that the cap A and the connecting seat C are buckled together with the elastic member B to form the floating fastener D. Then insert the buckle C2 at the lower end of the connecting seat C of the floating fastener D into the positioning plate E. And use hand tools to lock the screw A1 in the cap A down into the fixing plate E1 to achieve the purpose of locking the positioning plate E and the fixing plate E1. However, the connecting seat C of the floating fastener D is fixed on the positioning plate E, and then locked to the fixing plate E1 by the screw A1 of the cap A. When the positioning plate E and the fixing plate E1 are affected by external force and produce shaking, vibration or impact force, etc., the positioning plate E and the fixing plate E1 are subjected to the external force to produce shaking, yaw or displacement, etc. That is to say, it is easy to cause the electronic components on the positioning plate E and the fixing plate E1 to be affected by shaking, resulting in poor signal.

Therefore, in view of the above problems and deficiencies, the inventor collects relevant information, evaluates and considers from various parties, and uses years of experience in this industry, through continuous creation and modification, to design this floating fastener.

SUMMARY OF THE INVENTION

The present invention has been accomplished under the circumstances in view. It is therefore a main object of the present invention to provide a floating fastener, which comprises a base, a positioning member, an elastic member and a pad. The base comprises a main body provided with a through hole, a resisting ring protruded inside the through hole, a seat body with an enlarged outer diameter extended around the periphery of the main body, and a docking portion protruded from the bottom side of the seat body around the through hole. The positioning member comprises a shank inserted into the through hole inside the main body, a head with a larger outer diameter located at one end of the shank to expose the outside of the main body, a joint portion located at an opposite end of the shank to move in and out of the docking portion, and a stopper provided between the joint portion and the shank to abut against the resisting ring near the docking portion. The elastic member is set on the shank with one side thereof pressed against the head and an opposite side thereof stopped against the resisting ring. The pad is provided with an inner hole which is inserted outside the docking portion of the base, so that the pad abuts against the seat body near the docking portion. Moreover, the pad is made of soft material, which can achieve the purpose of absorbing the shaking and vibration of the floating fastener under the influence of external force.

Preferably, the outer diameter of the docking portion set on one side of the seat body is smaller than the outer diameter of the main body. The docking portion is provided with a connecting section. The floating fastener further comprises a cushion and a metal gasket. The cushion is made of a soft material, such as silicone, plastic, or rubber. The cushion is sleeved onto the docking portion of the base. The cushion is provided with a perforation for the docking portion to penetrate, and an inner slot on one side of the perforation. The metal gasket is set in the inner slot and has a ring hole for the connecting section on one side of the docking portion to be embedded therein, so that the cushion and the gasket are combined and positioned at the connecting section of the docking portion.

Preferably, the outer diameter of the docking portion set on one side of the seat body is smaller than the outer diameter of the main body. The docking portion comprises a plurality of claws arranged in a ring shape. Each claw is externally provided with a barb-shaped protruding hook on the side away from the seat body. The floating fastener further comprises a cushion and a metal gasket. The cushion is made of a soft material, such as silicone, plastic, or rubber. The cushion is sleeved onto the docking portion of the base. The cushion comprises a perforation for the docking portion to penetrate, and an inner slot on one side of the perforation. The metal gasket is set in the inner slot and comprises a ring hole for the docking portion to be embedded therein.

Preferably, there is an accommodating chamber inside the main body of the base, and the aperture of the accommodating chamber is larger than the through hole. An inner receiving hole is arranged in the docking portion, and the diameter of the inner receiving hole can be larger than that of the through hole but smaller than that of the accommodating chamber.

Preferably, the positioning member is provided with an operation portion on a top side of the head opposite to the shank. The operation portion can be a slotted slot, a cross slot, a hexagonal hole, a plum blossom hole or a polygonal hole, etc., which can be used for preset hand tool operation and control. The joint portion set on one side of the positioning member can be a screw or a pin rod.

DETAILED DESCRIPTION OF THE PREFERRED EMBODIMENT

Figure 1:
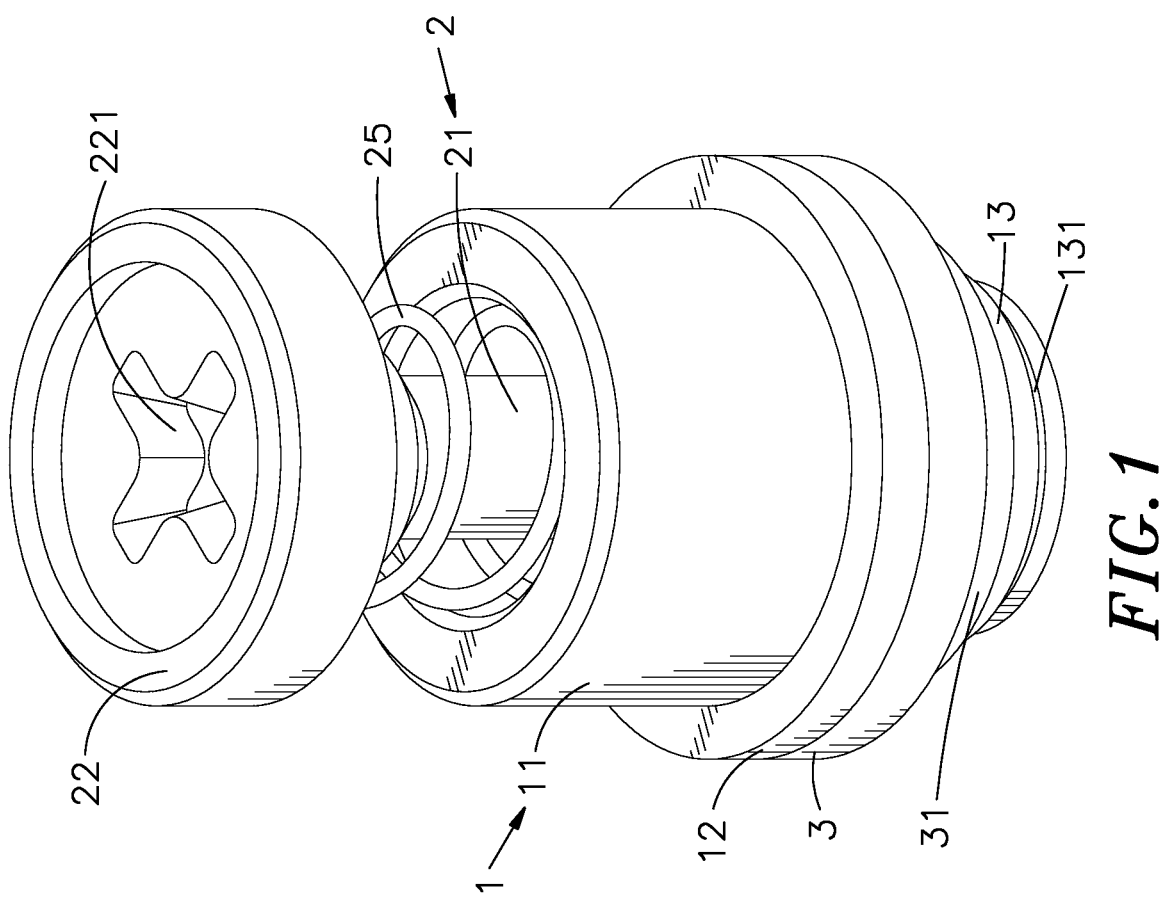
FIG. 1 is an oblique top elevational view of a floating fastener in accordance with a first embodiment of the present invention.
Figure 2:
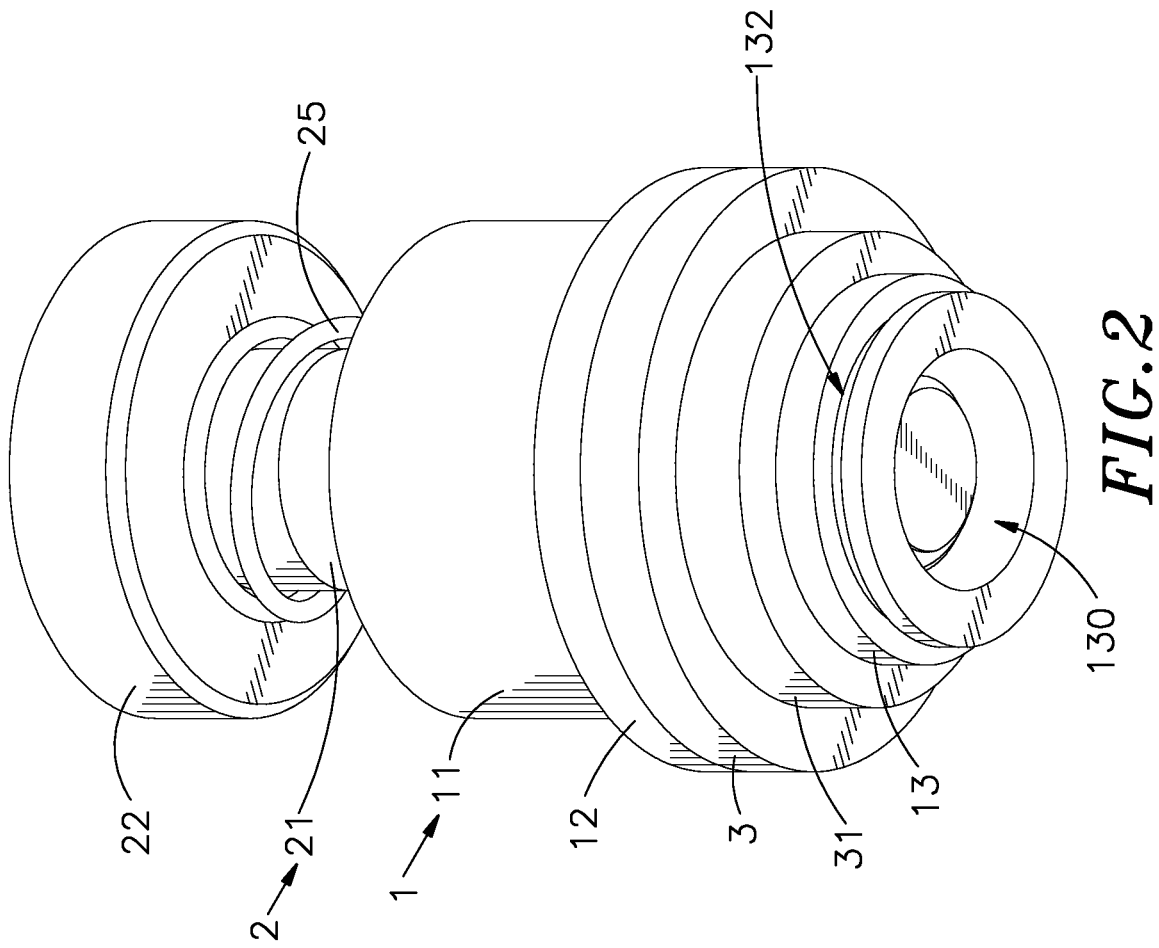
FIG. 2 is an oblique bottom elevational view of the floating fastener in accordance with the first embodiment of the present invention.
Figure 3:
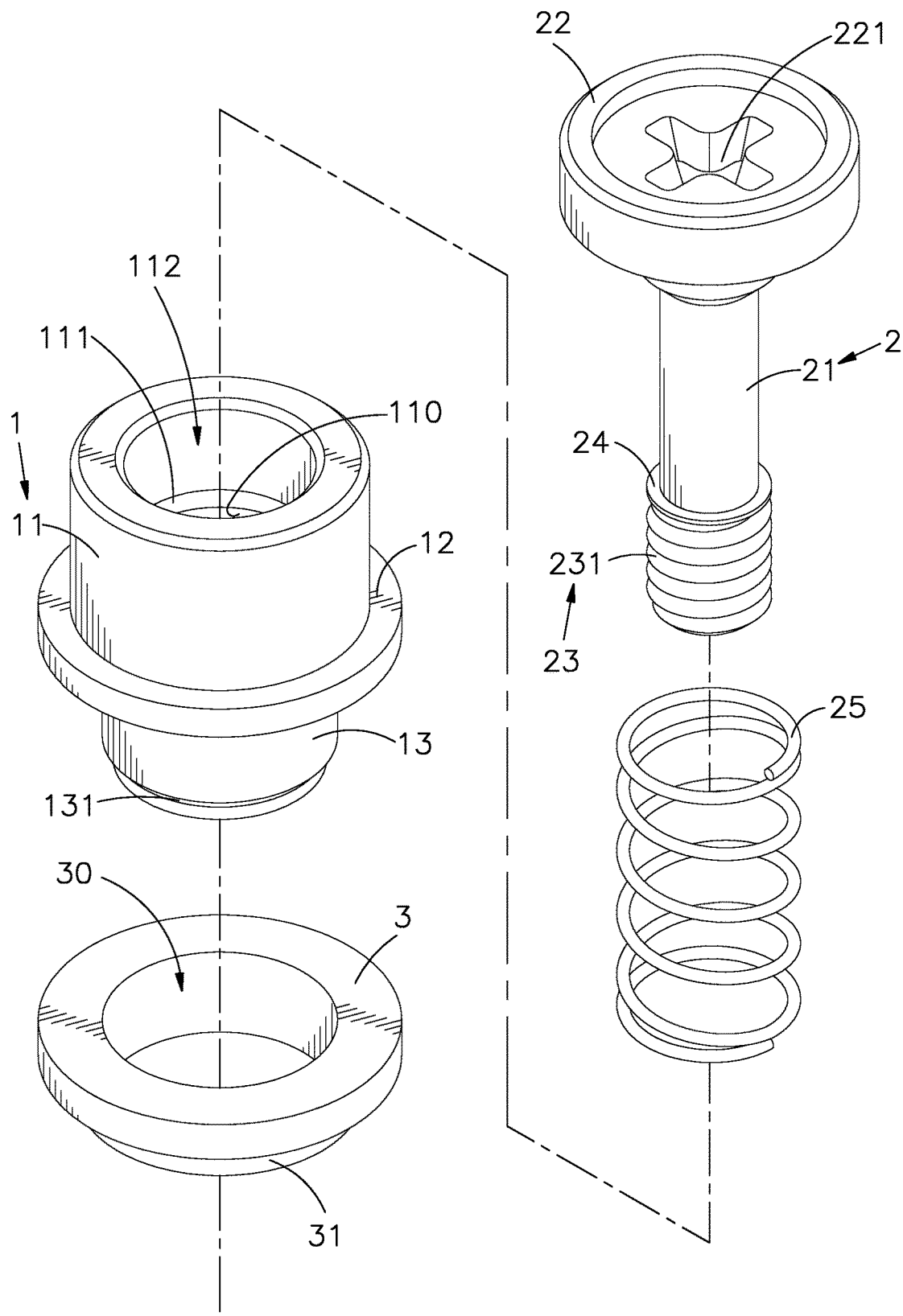
FIG. 3 is an exploded view of the floating fastener in accordance with the first embodiment of the present invention.
Figure 4:
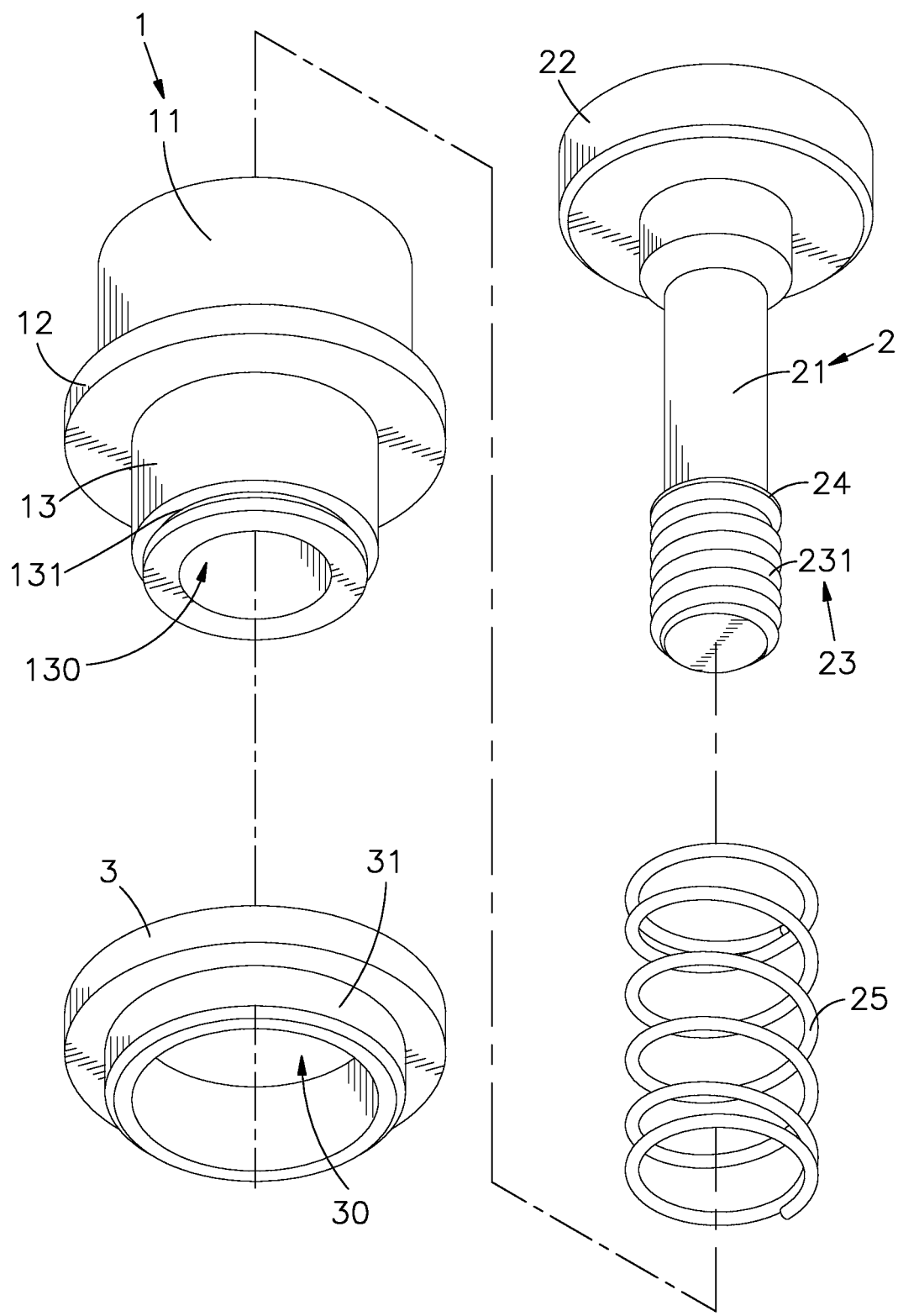
FIG. 4 corresponds to FIG. 3 when viewed from another angle.
Figure 5:
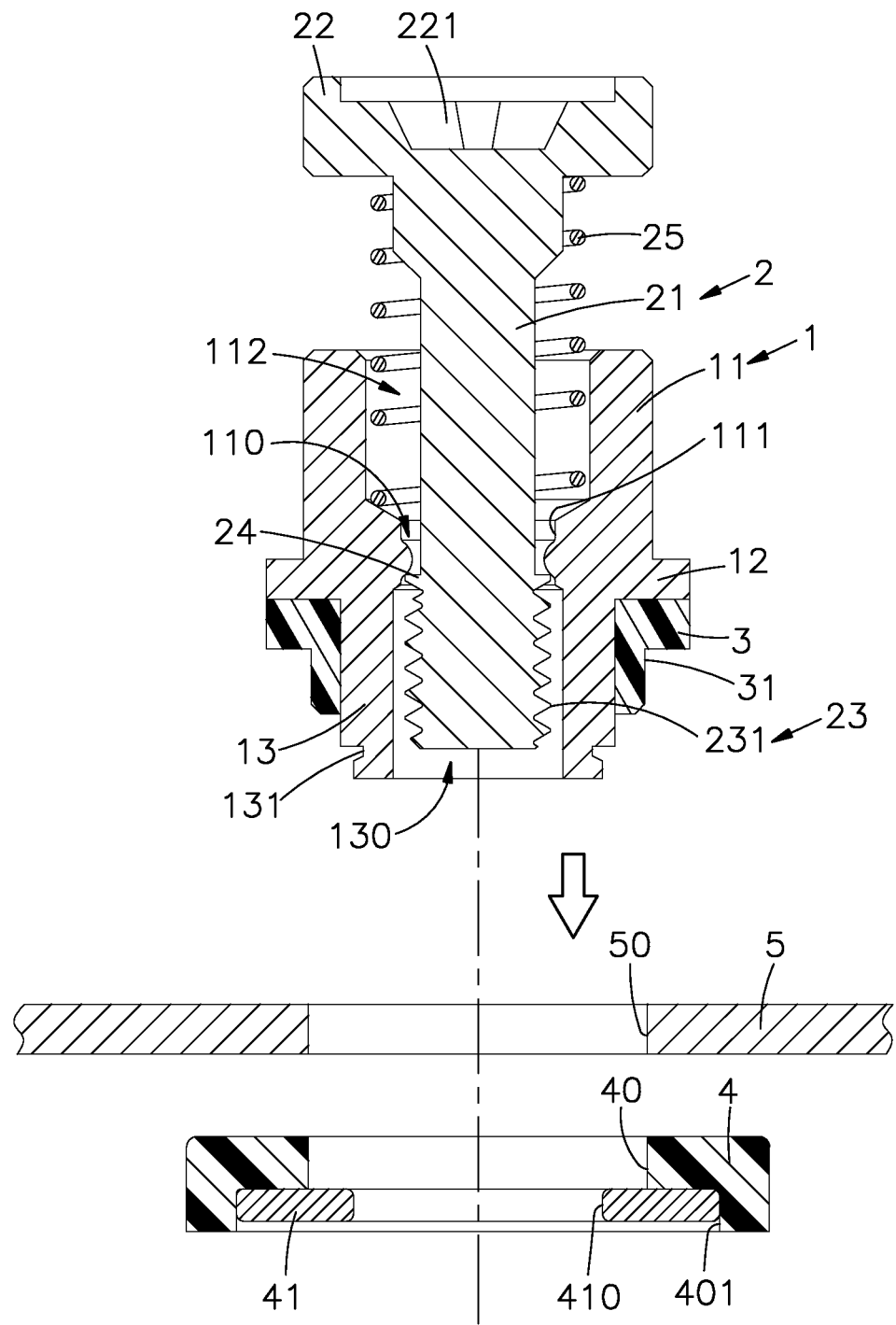
FIG. 5 is a side sectional view of the first embodiment of the present invention before assembly.
Figure 6:
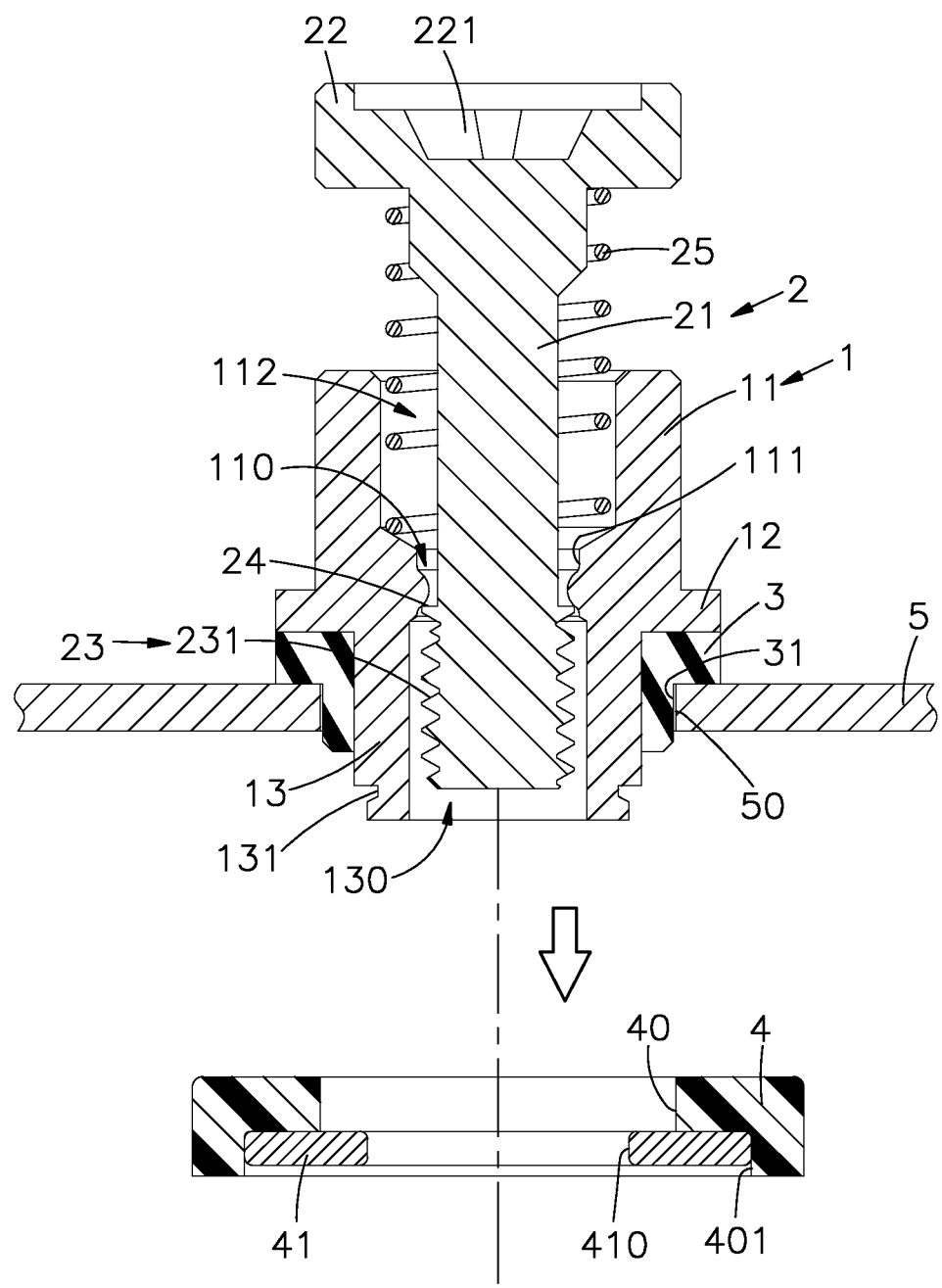
FIG. 6 is a side sectional view of the first embodiment of the present invention when assembled.
Figure 7:
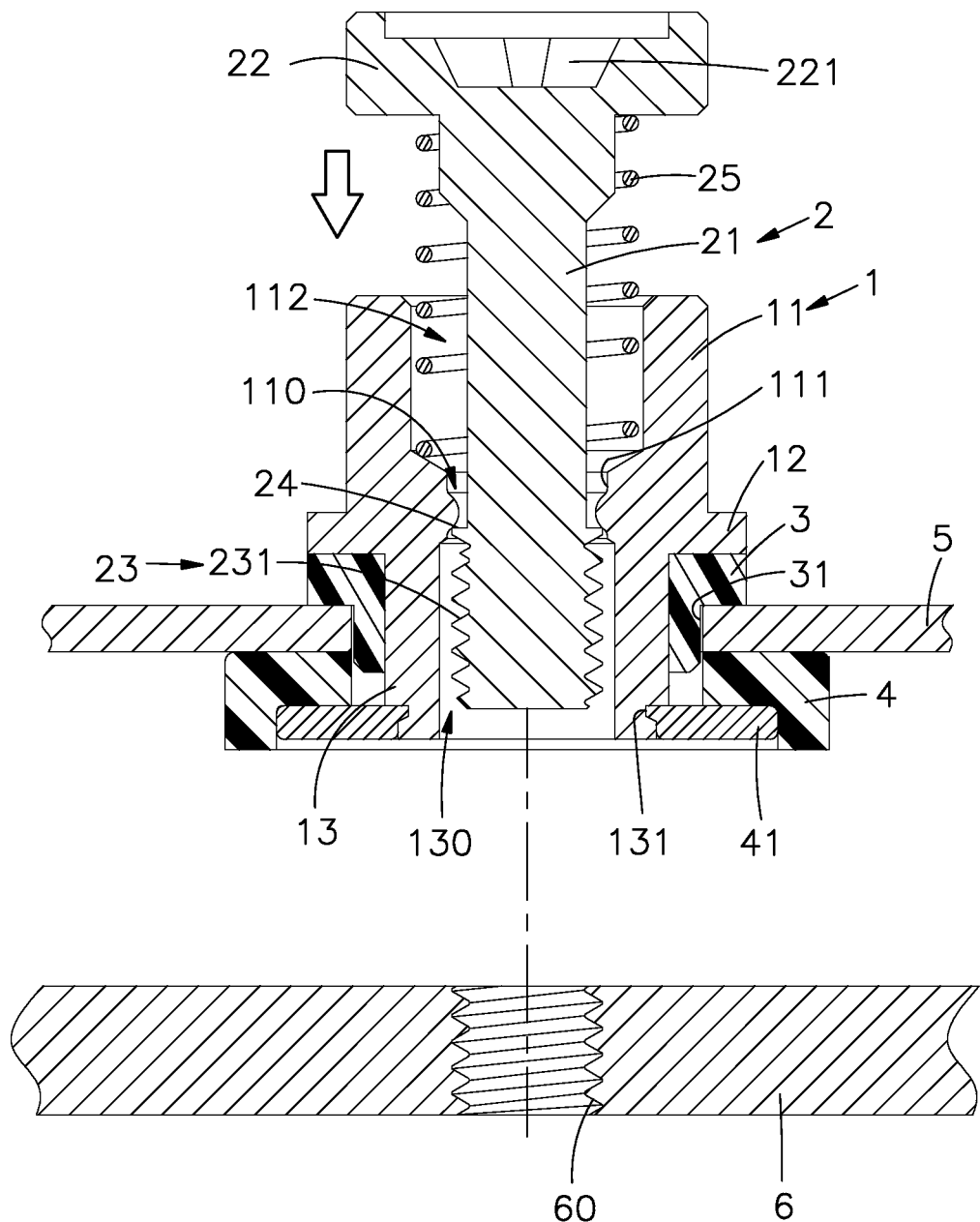
FIG. 7 is a side cross-sectional view after assembly of the first embodiment of the present invention.
Figure 8:
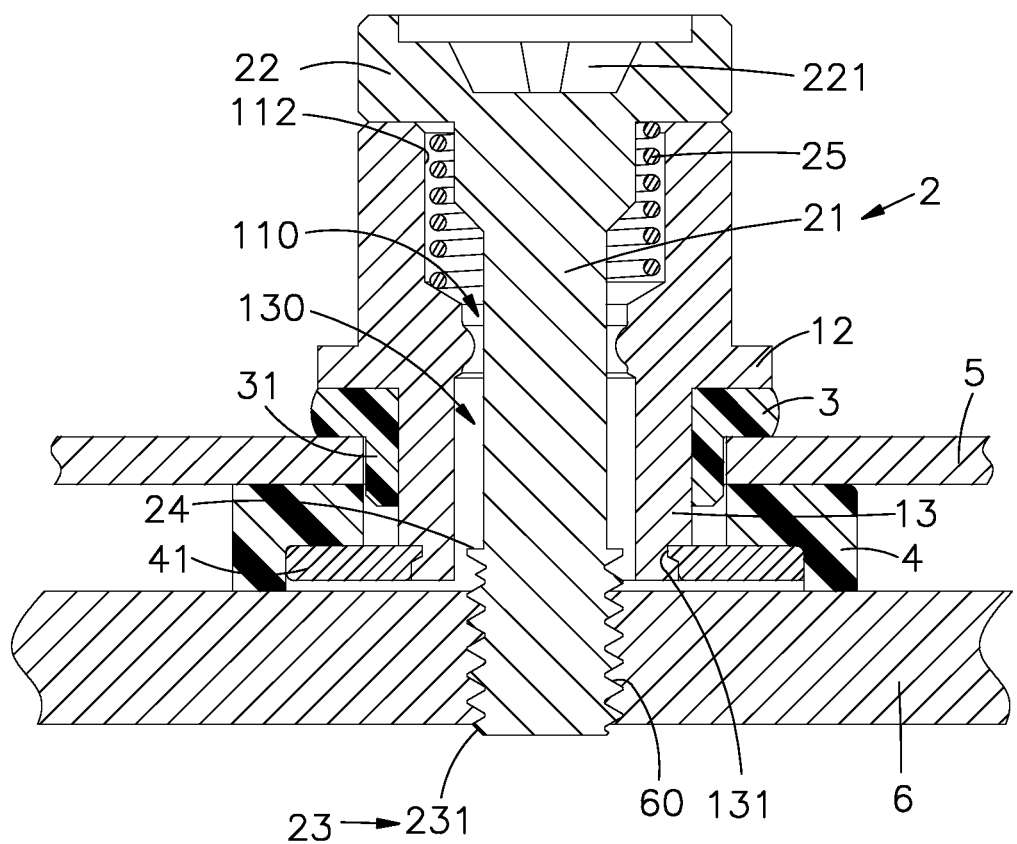
FIG. 8 is a side sectional applied view of the first embodiment of the present invention.
Figure 9:
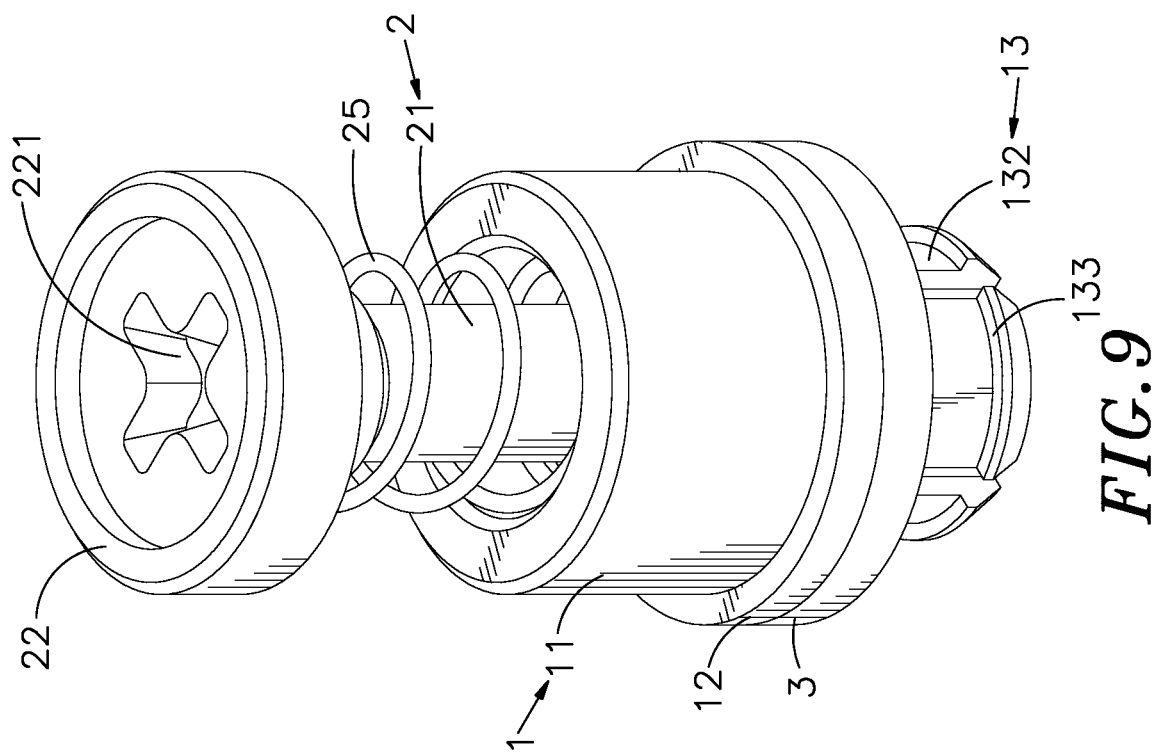
FIG. 9 is an oblique top elevational view of a floating fastener in accordance with a second embodiment of the present invention.
Figure 10:
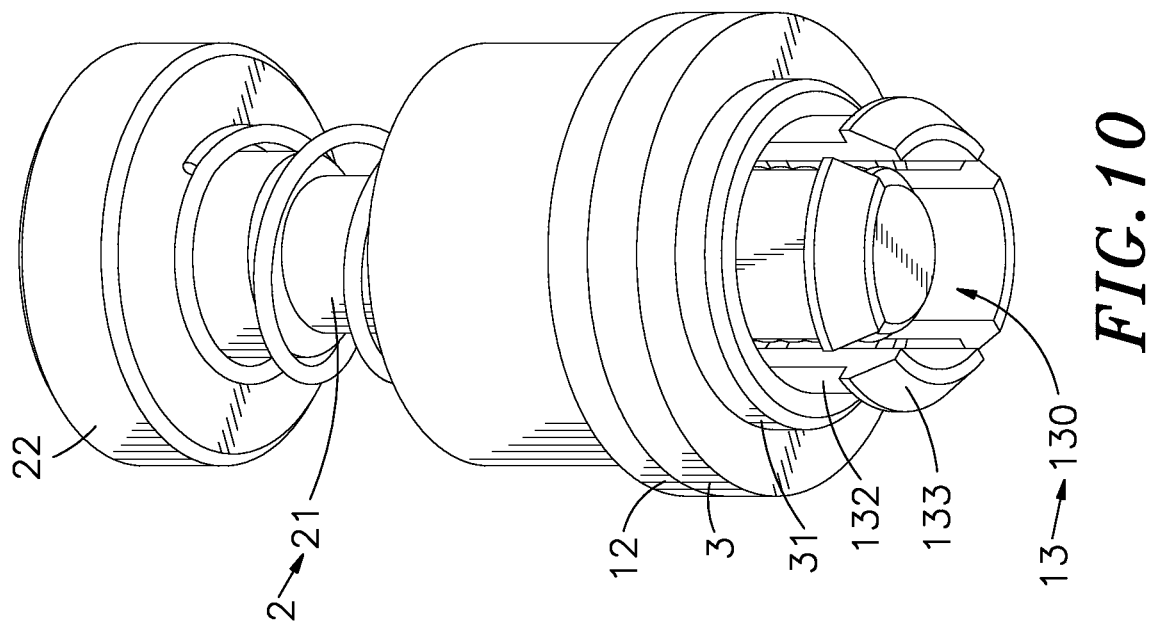
FIG. 10 is an oblique bottom elevational view of the floating fastener in accordance with the second embodiment of the present invention.
Figure 11:
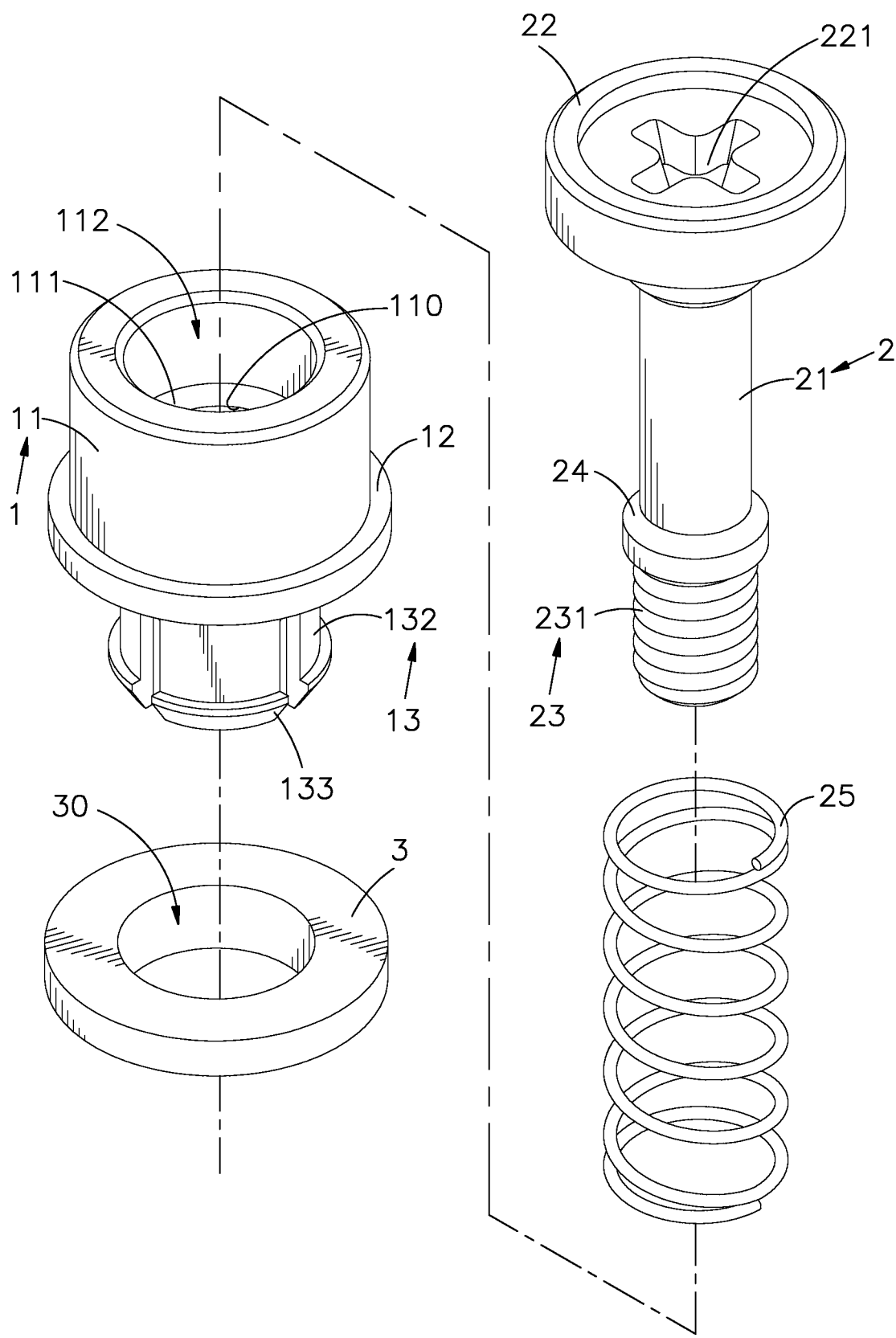
FIG. 11 is an exploded view of the floating fastener in accordance with the second embodiment of the present invention.
Figure 12:
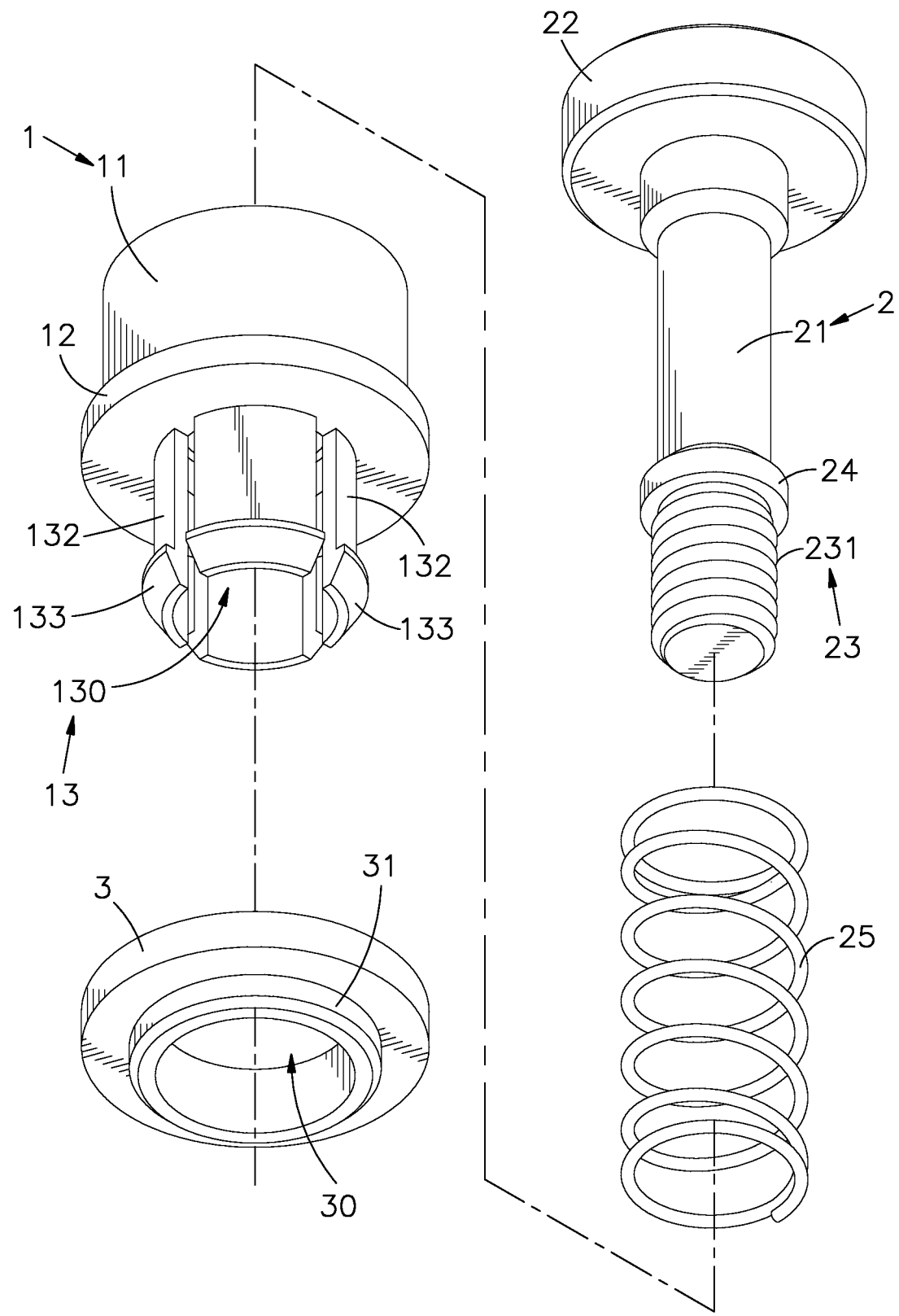
FIG. 12 corresponds to FIG. 11 when viewed from another angle.
Figure 13:
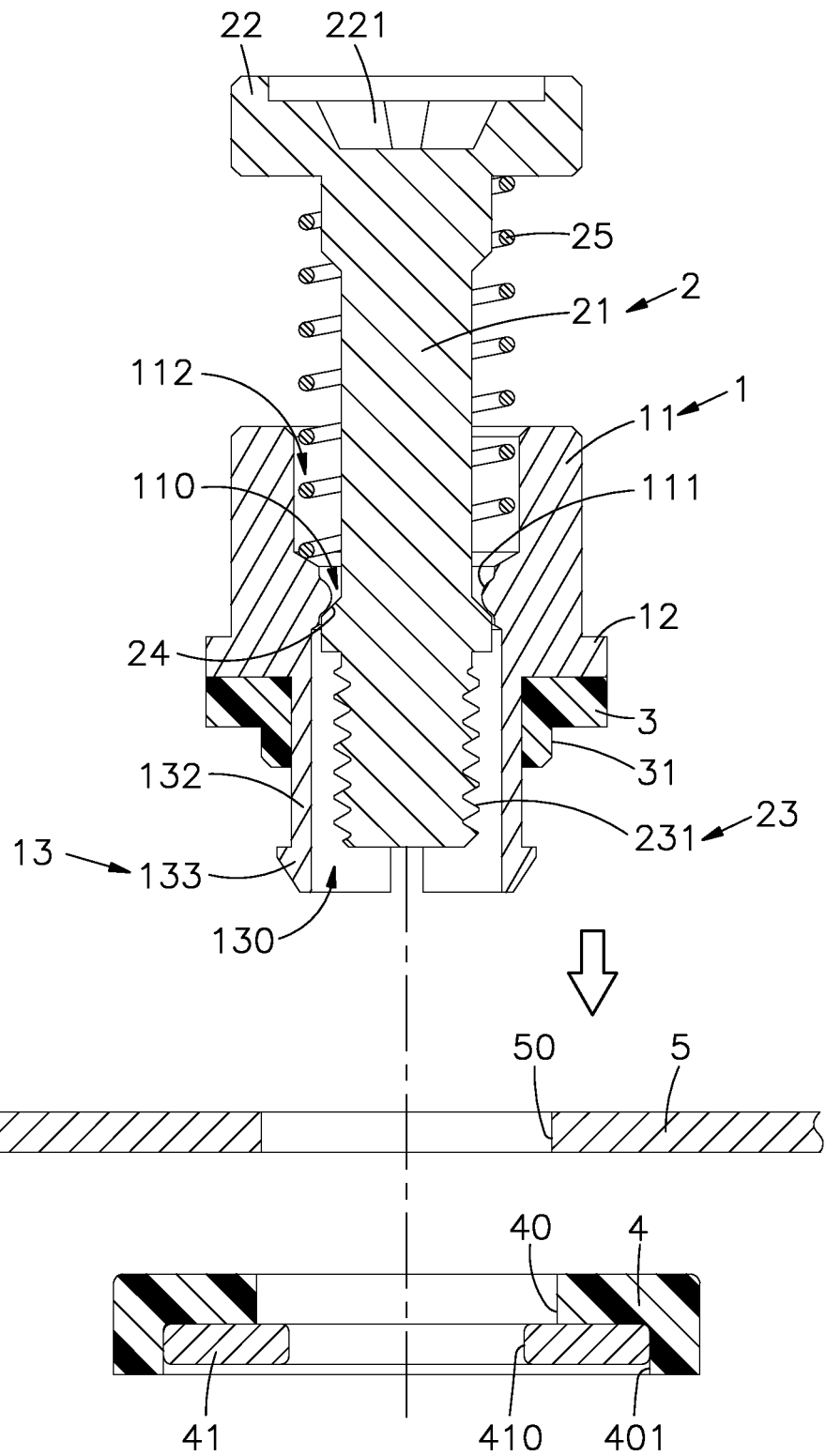
FIG. 13 is a side sectional view of the second embodiment of the present invention before assembly.

In order to achieve the above objects and effect, the technical means used in the present invention and its structure, implementation method, etc., the preferred embodiments of the present invention are hereby described in detail and their features and functions are as follows, so as to be fully understood.

Referring to FIGS. 1-5, a floating fastener in accordance with a first embodiment of the present invention is shown. The floating fastener comprises a base 1, a positioning member 2, an elastic member 25 and a pad 3.

The base 1 comprises a main body 11 provided with a through hole 110, a resisting ring 111 protruded inside the through hole 110, a seat body 12 with an enlarged outer diameter extended around the periphery of the main body 11, and a docking portion 13 protruded from a bottom side of the seat body 12 around the through hole 110 and provided with a connecting section 131 at a distal end thereof remote from the seat body 12.

The positioning member 2 comprises a shank 21 inserted into the through hole 110 inside the main body 11, a head 22 with a larger outer diameter located at one end of the shank 21 to expose the outside of the main body 11, a joint portion 23 located at an opposite end of the shank 21 to move in and out of the docking portion 13, and a stopper 24 provided between the joint portion 23 and the shank 21 to abut against the side of the resisting ring 111 near the inner side of the docking portion 13.

The elastic member 25 is set on the shank 21, and one side of the elastic member 25 is pressed against the side of the head 22, and the other side is against the other side of the resisting ring 111.

The pad 3 is made of a soft material, and is provided with an inner hole 30 which can be inserted outside the docking portion 13 of the base 1, so that the pad 3 abuts against the side surface of the seat body 12 near the docking portion 13.

The docking portion 13 provided on one side of the seat body 12 of the above-mentioned base 1 is further sleeved with a cushion 4. The cushion 4 has a perforation 40 for the docking portion 13 to penetrate, and an inner slot 401 on one side of the perforation 40, which can be covered with a metal gasket 41. A ring hole 410 is provided inside the metal gasket 41, so that the connecting section 131 on one side of the docking portion 13 can be combined by riveting or crimping, and be embedded in the ring hole 410, so that the gasket 41 and the cushion 4 are combined at the connecting section 131 of the docking portion 13. The cushion 4 can be made of soft materials such as silicone, plastic or rubber.

Also, the main body 11 of the base 1 is provided with an accommodating chamber 112, and the chamber diameter of the accommodating chamber 112 is larger than the hole diameter of the through hole 110. An inner receiving hole 130 is provided in the docking portion 13, and the diameter of the inner receiving hole 130 may be larger than that of the through hole 110 but smaller than that of the accommodating chamber 112.

In addition, the above-mentioned positioning member 2 is provided with an operation portion 221 on the other side surface of the head 22 relative to the shank 21. The operation portion 221 can be a slotted slot, a cross slot, an inner hexagonal hole, a plum blossom hole or a polygonal hole, etc., which can be used for preset hand tool operation and control. The joint portion 23 provided on one side of the positioning member 2 can be a screw 231 or a pin rod or the like.

As for the above-mentioned pad 3, an embedment portion 31 with a reduced outer diameter can be protruded on one surface of the pad 3, and the pad 3 can be made of soft materials such as silicone, plastic or rubber.

Please refer to FIGS. 1-8. It can be clearly seen from the drawings that, when the above-mentioned floating fastener of the present invention is implemented in practical application, the docking portion 13 on one side of the base 1 can be used to pass through the first positioning hole 50 of the preset first plate member 5, then use the embedment portion 31 protruding on the surface of the pad 3 which is provided outside the docking portion 13 to be embedded in the first positioning hole 50, so that the pad 3 is sandwiched between the seat body 12 and the preset first plate member 5 and the docking portion 13 passes through the other side of the preset first plate member 5. At the connecting section 131 of the docking portion 13 exposed on the other side of the preset first plate member 5, the cushion 4 and the gasket 41 are connected and fitted by means of riveting or crimping. That is, one side of the cushion 4 can be pressed against the other side of the preset first plate member 5.

The above-mentioned other side surfaces of the cushion 4 and the gasket 41 can be used for abutting on the preset second plate member 6. The preset second plate member 6 is provided with a second positioning hole 60 for the positioning member 2 to be inserted through the through hole 110 inside the main body 11 of the base 1. The operation portion 221 on the side of the head 22 can be operated by a preset hand tool, so as to operate the head 22 to compress the elastic member 25 which is inserted outside the shank 21, so that the joint portion 23 on the side of the stopper 24 can pass through the docking portion 13 and the cushion 4 and the gasket 41, and penetrate into the second positioning hole 60 of the preset second plate member 6. The base 1 of the floating fastener is positioned on the preset first plate member 5, and the positioning member 2 is fixed on the preset second plate member 6, so that through the pad 3 between the seat body 12 of the base 1 and the one side surface of the preset first plate member 5 and the cushion 4 between the other side surface of the preset first plate member 5 and the preset second plate member 6 form a double layer of the function of shock absorption, slowing down the shaking. When the preset first plate member 5 and the preset second plate member 6 are affected by external force and shake, vibrate, etc., the preset first plate member 5 can be clamped by the pad 3 and the cushion 4, and the pad 3 and the cushion 4 can be used to form the shock-absorbing, buffering and clamping functions for the preset first plate member 5, avoiding the phenomenon of poor signal caused by small vibrations affecting the electronic parts of the first plate member 5 and the second plate member 6, and achieving the purpose of reducing the impact of the floating fastener by external forces such as shaking and vibration.

Furthermore, the joint portion 23 can be a screw or a pin rod, etc., and the second positioning hole 60 can be a screw hole or a pin hole, etc., to achieve the purpose of fixing the docking portion 13 at the second positioning hole 60.

If a preset hand tool is used to operate the operation portion 221 on the side of the head 22, the head 22 is reversely operated to drive the shank 21 and the stopper 24 to drive the joint portion 23 to exit the second positioning hole 60 of the preset second plate member 6, the elastic member 25 sleeved onto the shank 21 of the positioning member 2 is used to push the head 22 to the outside of the main body 11 of the base 1 with elastic restoring force, so that the stopper 24 on the other side of the shank 21 abuts against the side edge of the resisting ring 111 near the inner receiving hole 130, achieving the purpose of separating the positioning member 2 from the preset second plate member 6. Thus, the positioning member 2 is limited to the through hole 110 of the main body 11 and the inner receiving hole 130 of the docking portion 13 of the base 1 on the preset first plate member 5, and the base 1 and positioning member 2 of the floating fastener and the preset first plate member 5 can be separated and taken out from the preset second plate member 6.

Referring to FIGS. 9-13, a floating fastener in accordance with a second embodiment of the present invention is shown. The floating fastener comprises a base 1, a positioning member 2, an elastic member 25 and a pad 3.

The base 1 comprises a main body 11 provided with a through hole 110, a resisting ring 111 protruded inside the through hole 110, a seat body 12 with an enlarged outer diameter extended around the periphery of the main body 11, and a docking portion 13 protruded from a bottom side of the seat body 12 around the through hole 110.

The positioning member 2 comprises a shank 21 inserted into the through hole 110 inside the main body 11, a head 22 with a larger outer diameter located at one end of the shank 21 to expose the outside of the main body 11, a joint portion 23 located at an opposite end of the shank 21 to move in and out of the docking portion 13, and a stopper 24 provided between the joint portion 23 and the shank 21 to abut against the side of the resisting ring 111 near the inner side of the docking portion 13.

The elastic member 25 is set on the shank 21, and one side of the elastic member 25 is pressed against the side of the head 22, and the other side is against the other side of the resisting ring 111.

The pad 3 is made of a soft material, and is provided with an inner hole 30 which can be inserted outside the docking portion 13 of the base 1, so that the pad 3 abuts against the side surface of the seat body 12 near the docking portion 13.

The diameter of the docking portion 13 provided on one side of the seat body 12 of the above-mentioned base 1 is smaller than the diameter of the main body 11. An inner receiving hole 130 is provided in the docking portion 13. The docking portion 13 comprises a plurality of claws 132 arranged in a ring shape, and a barb-shaped protruding hook 133 is respectively provided on the other side of each claw 132 away from the seat body 12. Each claw 132 of the docking portion 13 can be elastically deformed, stretched, and oscillated at the inner receiving hole 130. A cushion 4 is attached onto the docking portion 13 to hold against the barb-shaped protruding hooks 133. The cushion 4 has a perforation 40 for the docking portion 13 to penetrate, and an inner slot 401 on one side of the perforation 40, which can be covered with a metal gasket 41. A ring hole 410 is provided inside the metal gasket 41, so that the claws 132 and barb-shaped protruding hooks 133 of the docking portion 13 can be inserted in the ring hole 410. The claws 132 and barb-shaped protruding hooks 133 are stretched and deformed toward the inner receiving hole 130. After each barb-shaped protruding hook 133 passes through the perforation 40 and the ring hole 410 of the gasket 41, each claw 132 pushes each barb-shaped protruding hook 133 against one side of the ring hole 410 by elastic restoring force, so that each claw 132 abuts against the inner receiving hole 130. The cushion 4 can be made of soft materials such as silicone, plastic or rubber.

The main body 11 of the base 1 is provided with an accommodating chamber 112, and the chamber diameter of the accommodating chamber 112 is larger than the hole diameter of the through hole 110. Furthermore, the diameter of the inner receiving hole 130 may be larger than that of the through hole 110 but smaller than that of the accommodating chamber 112.

In addition, the above-mentioned positioning member 2 is provided with an operation portion 221 on the other side surface of the head 22 relative to the shank 21. The operation portion 221 can be a slotted slot, a cross slot, an inner hexagonal hole, a plum blossom hole or a polygonal hole, etc., which can be used for preset hand tool operation and control. The joint portion 23 provided on one side of the positioning member 2 can be a screw 231 or a pin rod or the like.

As for the above-mentioned pad 3, an embedment portion 31 with a reduced outer diameter can be protruded on one surface of the pad 3, and the pad 3 can be made of soft materials such as silicone, plastic or rubber.

Figure 14:
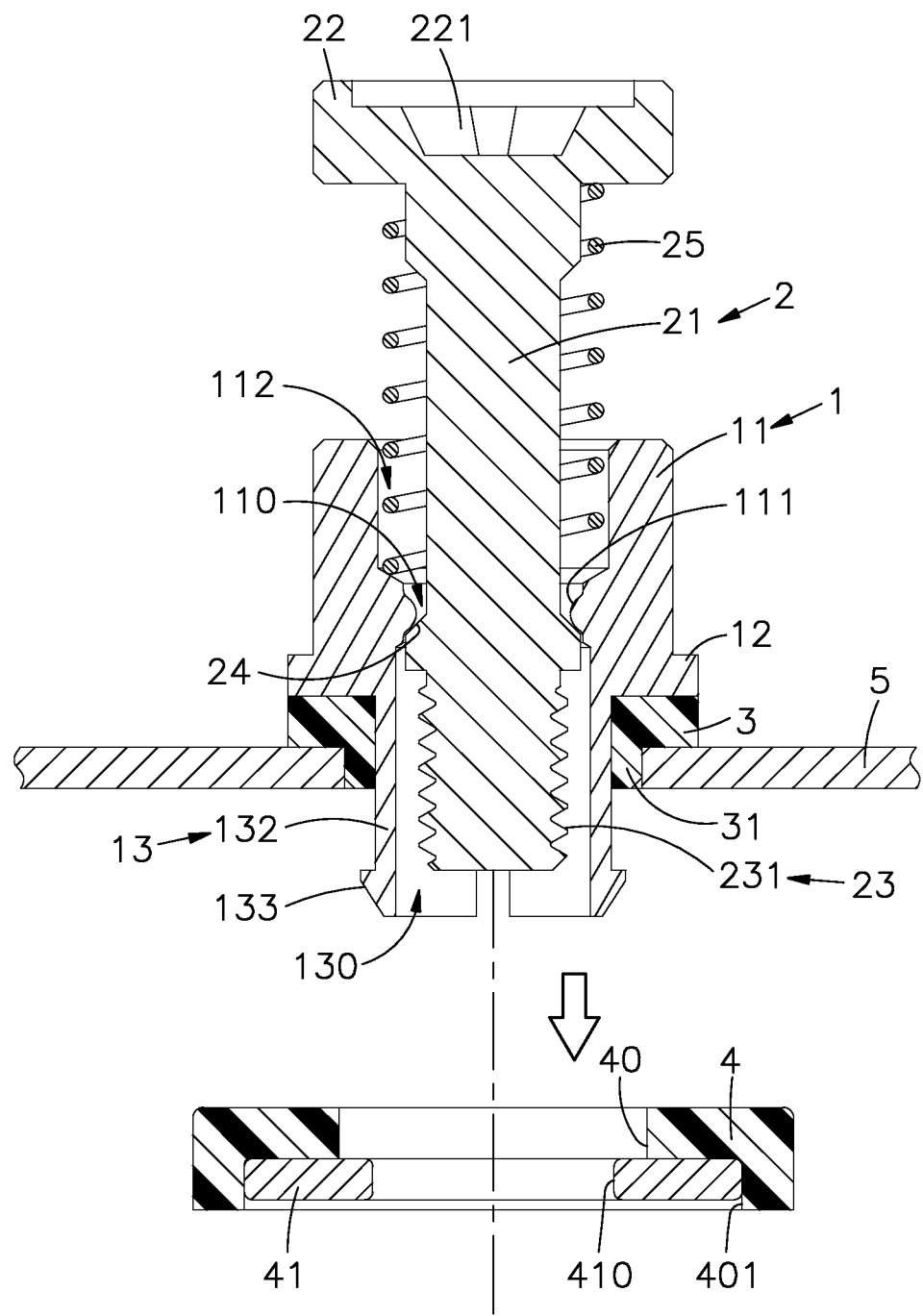
FIG. 14 is a side sectional view of the second embodiment of the present invention when assembled.
Figure 15:
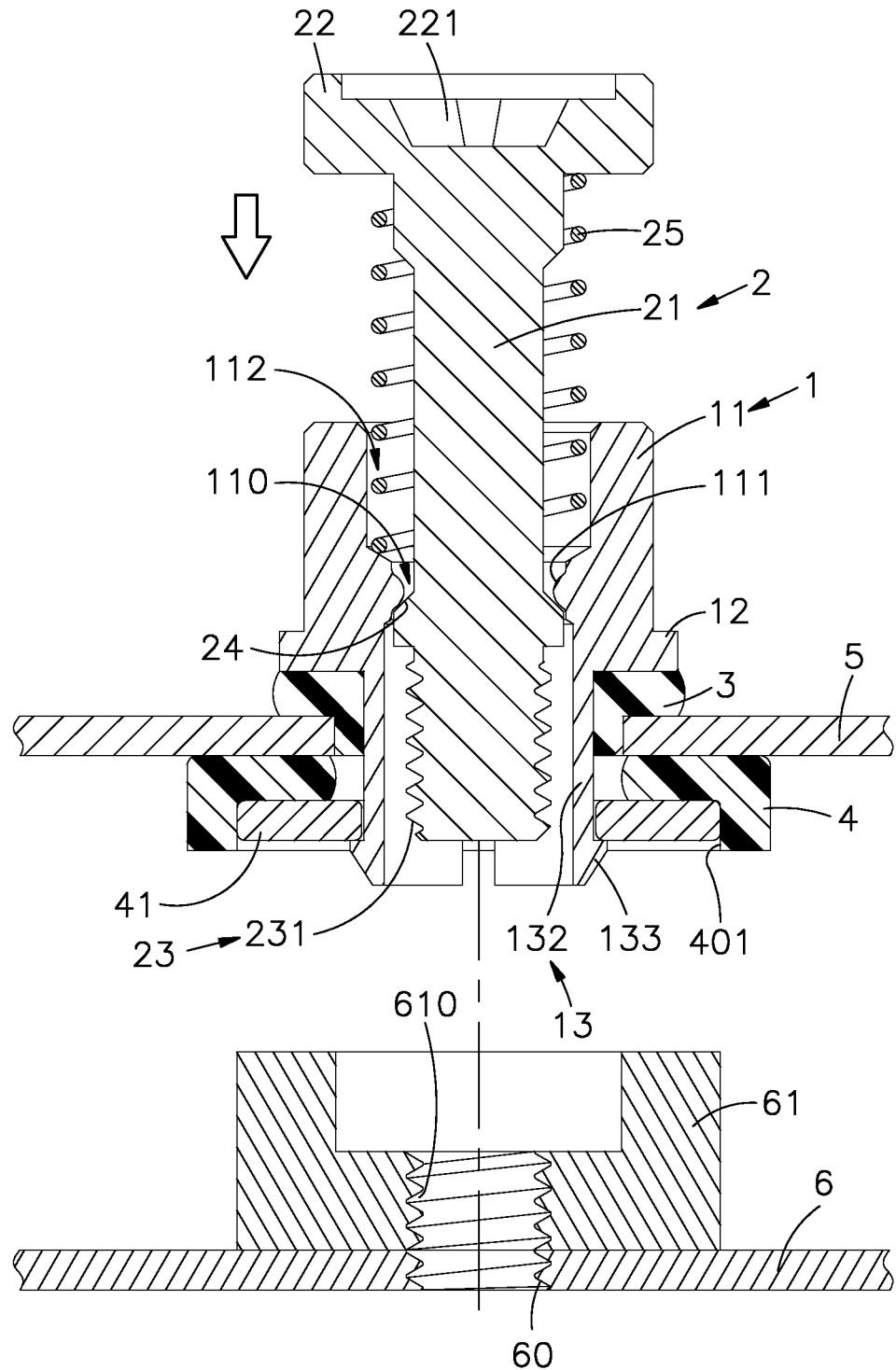
FIG. 15 is a side cross-sectional view after assembly of the second embodiment of the present invention.
Figure 16:
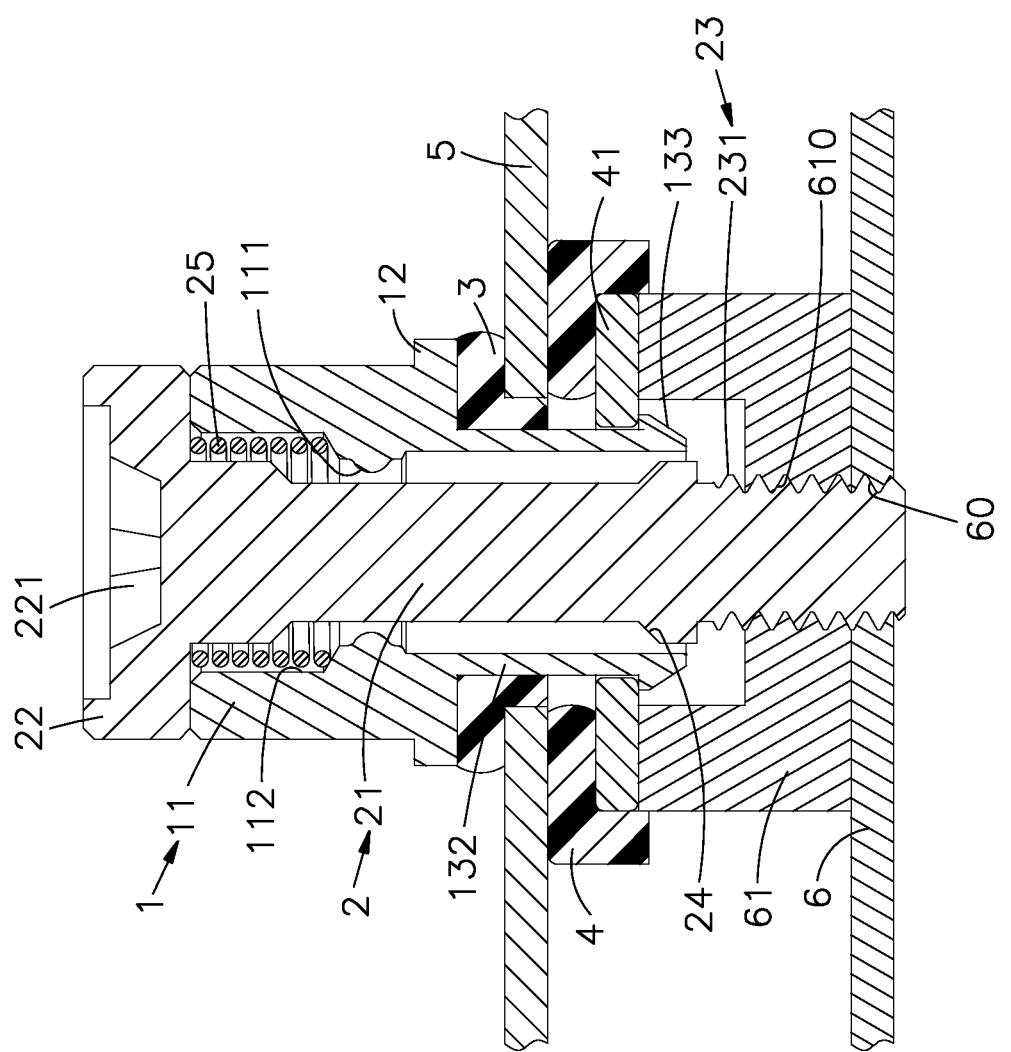
FIG. 16 is a side sectional applied view of the second embodiment of the present invention.
Figure 17:
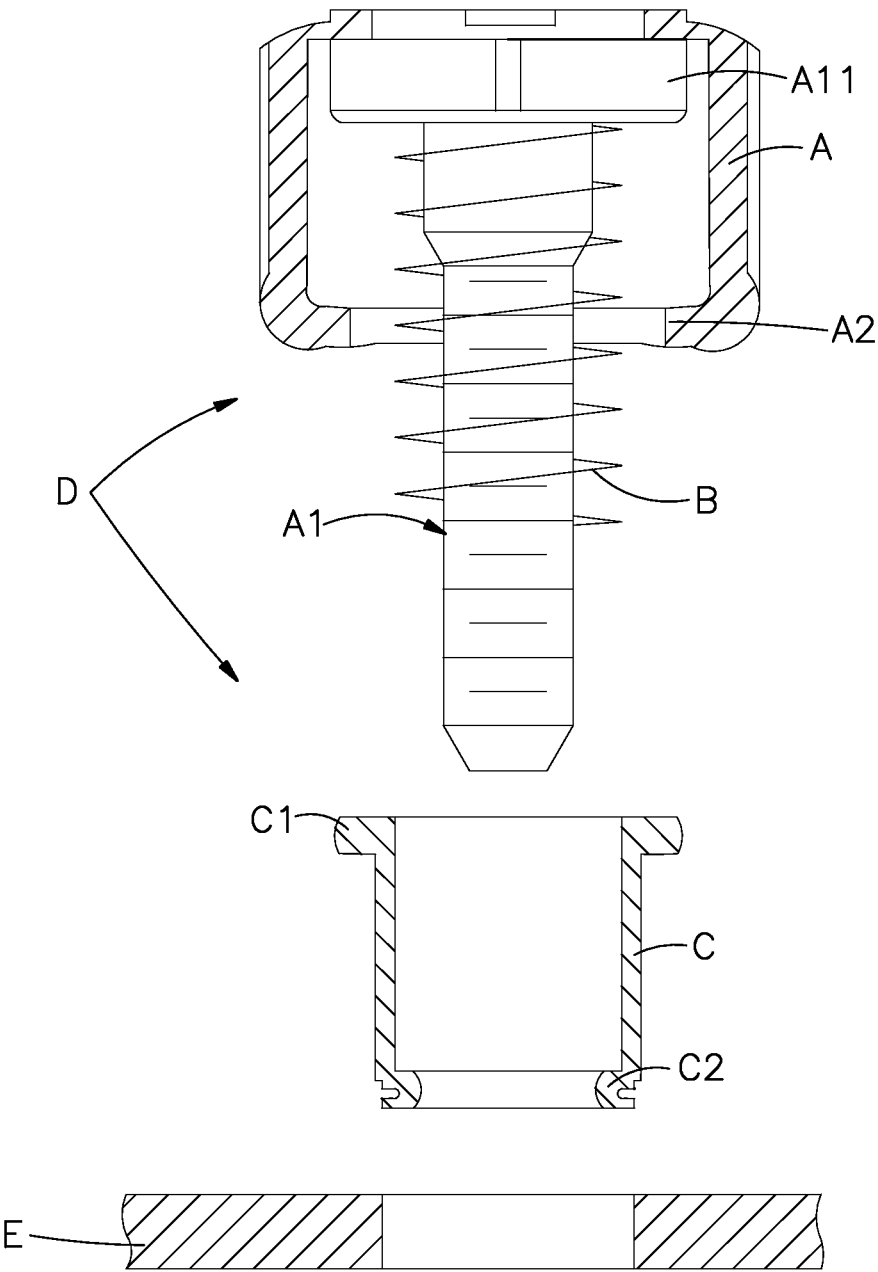
FIG. 17 is a sectional exploded view of a floating fastener according to the prior art.
Figure 18:
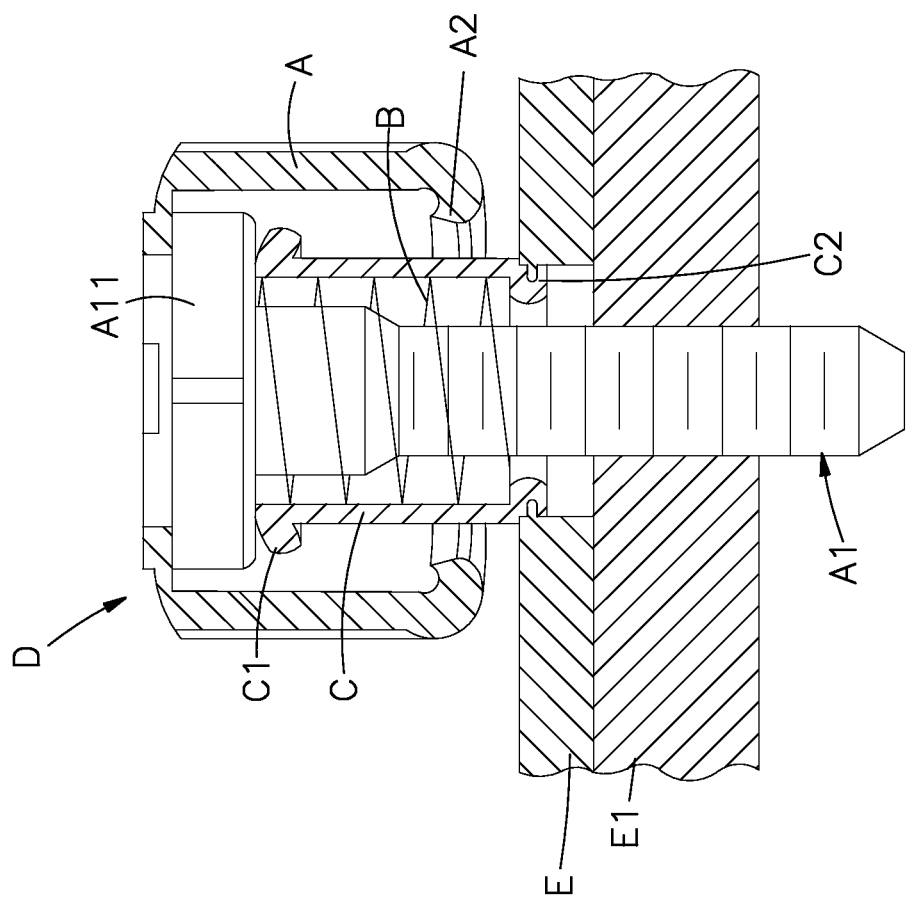
FIG. 18 is a sectional side view of the floating fastener according to the prior art.

Please refer to FIGS. 14-16 and FIGS. 9-13 again. It can be clearly seen from the drawings that, when the above-mentioned floating fastener of the present invention is implemented in practical application, the docking portion 13 on one side of the base 1 can be used to pass through the first positioning hole 50 of the preset first plate member 5, then use the embedment portion 31 protruding on the surface of the pad 3 which is provided outside the docking portion 13 to be embedded in the first positioning hole 50, so that the pad 3 is sandwiched between the seat body 12 and the preset first plate member 5 and the docking portion 13 passes through the other side of the preset first plate member 5. At this time, the perforation 40 of the cushion 4 and the ring hole 410 of the gasket 41 can be attached onto the end of the docking portion 13 that exposes on the other side of the preset first plate member 5, so that one side surface of the gasket 41 can abut against the barb-shaped protruding hooks 133 on the side of the claws 132 of the docking portion 13, that is, the cushion 4 and the gasket 41 are sandwiched between the preset first plate member 5 and the barb-shaped protruding hooks 133 of the docking portion 13.

The other side of the above-mentioned gasket 41 can abut against the top of the connecting block 61 on the preset second plate member 6. The preset second plate member 6 is provided with a second positioning hole 60. The connecting block 61 is provided with a connecting hole 610 in alignment with the second positioning hole 60 for the positioning member 2 to be inserted through the through hole 110 inside the main body 11 of the base 1. The operation portion 221 on the side of the head 22 can be operated by a preset hand tool, so as to operate the head 22 to compress the elastic member 25 which is inserted outside the shank 21, so that the joint portion 23 on the side of the stopper 24 can pass through the docking portion 13 and penetrate into the connecting hole 610 of the connecting block 61 and the second positioning hole 60 of the preset second plate member 6. The base 1 of the floating fastener is positioned on the preset first plate member 5, and the positioning member 2 is fixed on the connecting block 61 of the preset second plate member 6, so that through the pad 3 between the seat body 12 of the base 1 and the one side surface of the preset first plate member 5, and the cushion 4 between the other side surface of the preset first plate member 5 and the connecting block 61 of the preset second plate member 6 form a double layer of the function of shock absorption, slowing down the shaking.

When the preset first plate member 5 and the preset second plate member 6 are affected by external force and shake, vibrate, etc., the preset first plate member 5 can be clamped by the pad 3 and the cushion 4, and the pad 3 and the cushion 4 can be used to form the shock-absorbing, buffering and clamping functions for the preset first plate member 5, avoiding the phenomenon of poor signal caused by small vibrations affecting the electronic parts of the first plate member 5 and the second plate member 6, and achieving the purpose of reducing the impact of the floating fastener by external forces such as shaking and vibration.

Furthermore, the joint portion 23 can be a screw or a pin rod, etc., and the second positioning hole 60, connecting hole 610 can be a screw hole or a pin hole, etc., to achieve the purpose of fixing the docking portion 13 at the second positioning hole 60, connecting hole 610.

If a preset hand tool is used to operate the operation portion 221 on the side of the head 22, the head 22 is reversely operated to drive the shank 21 and the stopper 24 to drive the joint portion 23 to exit the connecting hole 610 of the connecting block 61 and the second positioning hole 60 of the preset second plate member 6, the elastic member 25 sleeved onto the shank 21 of the positioning member 2 is used to push the head 22 to the outside of the main body 11 of the base 1 with elastic restoring force, so that the stopper 24 on the other side of the shank 21 abuts against the side edge of the resisting ring 111 near the inner receiving hole 130, achieving the purpose of separating the positioning member 2 from the connecting block 61 and the preset second plate member 6. Thus, the positioning member 2 is limited to the through hole 110 of the main body 11 and the inner receiving hole 130 of the docking portion 13 of the base 1 on the preset first plate member 5, and the base 1 and positioning member 2 of the floating fastener and the preset first plate member 5 can be separated and taken out from the preset second plate member 6.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A floating fastener, comprising a base, a positioning member, an elastic member and a pad, wherein:
said base comprises a main body provided with a through hole, a resisting ring protruded inside said through hole, a seat body with an enlarged outer diameter extended around the periphery of said main body, and a docking portion protruded from a bottom side of said seat body around said through hole and provided with a connecting section at a distal end thereof remote from said seat body;
said positioning member comprises a shank inserted into said through hole inside said main body, a head with a larger outer diameter located at one end of said shank so as to be exposed along with an outside of said main body, a joint portion located at an opposite end of said shank to move in and out of said docking portion, and a stopper provided between said joint portion and said shank to abut against said resisting ring near said docking portion;
said elastic member is set on said shank with one side thereof pressed against said head and an opposite side thereof stopped against said resisting ring;
said pad is made of a soft material, and is provided with an inner hole which is inserted outside said docking portion of said base, so that said pad abuts against said seat body near said docking portion,
wherein the floating fastener further comprises a cushion and a metal gasket, said cushion is made of a soft material selected from the group of silicone, plastic and rubber, said cushion being sleeved onto said docking portion of said base, said cushion comprises a perforation for said docking portion to penetrate and an inner slot on one side of said perforation, said metal gasket being set in said inner slot and comprises a ring hole for said connecting section on one side of said docking portion to be embedded therein.

2. The floating fastener as claimed in claim 1, wherein said main body of said base is provided with an accommodating chamber, and the diameter of said accommodating chamber is larger than the diameter of said through hole; said docking portion is provided with an inner receiving hole, and the diameter of said inner receiving hole is larger than that of said through hole but smaller than that of said accommodating chamber.

3. The floating fastener as claimed in claim 1, wherein said pad comprises an embedment portion with a reduced outer diameter protruded on one side thereof, and said pad is made of a soft material selected from the group of silicone, plastic and rubber.

4. A floating fastener, comprising a base, a positioning member, an elastic member and a pad, wherein:
said base comprises a main body provided with a through hole, a resisting ring protruded inside said through hole, a seat body with an enlarged outer diameter extended around the periphery of said main body, and a docking portion protruded from a bottom side of said seat body around said through hole and provided with a plurality of claws;
said positioning member comprises a shank inserted into said through hole inside said main body, a head with a larger outer diameter located at one end of said shank to expose the outside of said main body, a joint portion located at an opposite end of said shank to move in and out of said claws of said docking portion, and a stopper provided between said joint portion and said shank to abut against said resisting ring near said docking portion;

said elastic member is set on said shank with one side thereof pressed against said head and an opposite side thereof stopped against said resisting ring;

said pad is made of a soft material, and is provided with an inner hole which is inserted outside said docking portion of said base, so that said pad abuts against said seat body near said docking portion.

5. The floating fastener as claimed in claim 4, wherein the diameter of said docking portion is smaller than the diameter of said main body; said claws of said docking portion are arranged in a ring shape, and each said claw is externally provided with a barb-shaped protruding hook on the side away from said seat body.

6. The floating fastener as claimed in claim 5, further comprising a cushion and a metal gasket, said cushion being made of a soft material selected from the group of silicone, plastic and rubber, said cushion being sleeved onto said docking portion of said base, said cushion comprising a perforation for said docking portion to penetrate and an inner slot on one side of said perforation, said metal gasket being set in said inner slot and comprising a ring hole for said docking portion to be embedded therein.

7. The floating fastener as claimed in claim 6, wherein said main body of said base is provided with an accommodating chamber, and the diameter of said accommodating chamber is larger than the diameter of said through hole; said docking portion is provided with an inner receiving hole, and the diameter of said inner receiving hole is larger than that of said through hole but smaller than that of said accommodating chamber.

8. The floating fastener as claimed in claim 4, wherein said joint portion set on one side of said positioning member is selectively a screw or a pin rod.

9. The floating fastener as claimed in claim 4, wherein said pad comprises an embedment portion with a reduced outer diameter protruded on one side thereof, and said pad is made of a soft material selected from the group of silicone, plastic and rubber.

10. A floating fastener, comprising a base, a positioning member, a pad, a cushion and a metal gasket, wherein:

said base comprises a main body provided with a through hole, and a docking portion protruded from one side of said main body around said through hole and provided with a connecting section at a distal end thereof remote from said main body;

said positioning member comprises a shank inserted into said through hole inside said main body, a head located at one end of said shank to expose the outside of said main body, and a joint portion located at an opposite end of said shank to move in and out of said connecting section of said docking portion;

said pad is made of a soft material, and is provided with an inner hole which is inserted outside said docking portion of said base, so that said pad is positioned outside said docking portion;

said cushion is coupled outside said connecting section of said docking portion, said cushion comprising a perforation for said connecting section of said docking portion to penetrate and an inner slot on one side of said perforation;

said metal gasket is set in said inner slot and provided with a ring hole for said docking portion to be embedded therein, for allowing a predetermined first plate member to be sleeved on the outside of said docking portion and clamped between said cushion and said pad.

11. The floating fastener as claimed in claim 10, wherein said base further comprises a resisting ring protruded inside said through hole, a seat body with an enlarged outer diameter extended around the periphery of said main body; said pad has one side thereof abutted against said seat body and is positioned outside said docking portion; said main body of said base is provided with an accommodating chamber, and the diameter of said accommodating chamber is larger than the diameter of said through hole; said docking portion is provided with an inner receiving hole, and the diameter of said inner receiving hole is larger than that of said through hole but smaller than that of said accommodating chamber.

12. The floating fastener as claimed in claim 10, wherein said pad and said cushion are made of a soft material selected from the group of silicone, plastic and rubber; said pad comprises an embedment portion with a reduced outer diameter protruded on one side thereof.

13. The floating fastener as claimed in claim 10, wherein said positioning member is provided with an operation portion on a top side of said head opposite to said shank, said operation portion being selectively a slotted slot, a cross slot, an inner hexagonal hole, a plum blossom hole or a polygonal hole.

14. The floating fastener as claimed in claim 10, wherein said base further comprises a resisting ring protruded inside said through hole; said positioning member further comprises a stopper provided between said joint portion and said shank to abut against said resisting ring near said docking portion; said positioning member is provided with an elastic member, said elastic member being set on said shank with one side thereof pressed against said head and an opposite side thereof stopped against said resisting ring.

* * * * *